(12) United States Patent
Horikawa et al.

(10) Patent No.: US 11,626,586 B2
(45) Date of Patent: Apr. 11, 2023

(54) POSITIVE ELECTRODE MATERIAL OF LITHIUM SECONDARY BATTERY, AND LITHIUM SECONDARY BATTERY USING SAME

(71) Applicants: TOYOTA JIDOSHA KABUSHIKI KAISHA, Toyota (JP); NATIONAL UNIVERSITY CORPORATION OKAYAMA UNIVERSITY, Okayama (JP)

(72) Inventors: Daisuke Horikawa, Toyota (JP); Yuji Yamamoto, Toyota (JP); Takashi Teranishi, Okayama (JP)

(73) Assignees: TOYOTA JIDOSHA KABUSHIKI KAISHA, Toyota (JP); NATIONAL UNIVERSITY CORPORATION OKAYAMA UNIVERSITY, Okayama (JP)

( * ) Notice: Subject to any disclaimer, the term of this patent is extended or adjusted under 35 U.S.C. 154(b) by 423 days.

(21) Appl. No.: 16/883,078

(22) Filed: May 26, 2020

(65) Prior Publication Data
US 2020/0388834 A1 Dec. 10, 2020

(30) Foreign Application Priority Data

Jun. 6, 2019 (JP) .............................. JP2019-106058

(51) Int. Cl.
*H01M 4/36* (2006.01)
*H01M 4/131* (2010.01)
(Continued)

(52) U.S. Cl.
CPC .......... *H01M 4/366* (2013.01); *H01M 4/131* (2013.01); *H01M 10/0525* (2013.01);
(Continued)

(58) Field of Classification Search
None
See application file for complete search history.

(56) References Cited

FOREIGN PATENT DOCUMENTS

| JP | 2004-103566 A | 4/2004 |
| JP | 2015-099646 A | 5/2015 |
| JP | 2017-152294 A | 8/2017 |

OTHER PUBLICATIONS

Machine translation of Japanese Patent Publication No. 2017-152294 (Year: 2017).*

* cited by examiner

*Primary Examiner* — Wyatt P McConnell
(74) *Attorney, Agent, or Firm* — Oliff PLC (57) ABSTRACT

Provided is a positive electrode material which can impart a lithium secondary battery with excellent low temperature output characteristics, excellent high temperature cycle characteristics and excellent durability against high voltage. A positive electrode material of a lithium secondary battery disclosed here includes a positive electrode active substance particle, a Li-free first coating at the surface of the positive electrode active substance particle, and a Li-containing second coating at the surface of the positive electrode active substance particle. The first coating contains a titanium oxide represented by $TiO_2$ or $Ti_nO_{2n-1}$, wherein n is an integer of 3 or more. The second coating contains a composite oxide containing Li and Ti, wherein the ratio of the number of atoms of Li relative to the number of atoms of Ti is at least 0.1 and at most 3.

6 Claims, 3 Drawing Sheets

(51) Int. Cl.
*H01M 10/0525* (2010.01)
*H01M 4/02* (2006.01)
(52) U.S. Cl.
CPC .............................. *H01M 2004/021* (2013.01); *H01M 2004/027* (2013.01); *H01M 2004/028* (2013.01)

POSITIVE ELECTRODE MATERIAL OF LITHIUM SECONDARY BATTERY, AND LITHIUM SECONDARY BATTERY USING SAME

BACKGROUND OF THE INVENTION

1. Field of the Invention

The present disclosure relates to a positive electrode material of a lithium secondary battery. The present disclosure also relates to a lithium secondary battery using the positive electrode material. It should be noted that this application claims priority on the basis of Japanese Patent Application No. 2019-106058, which was filed on Jun. 6, 2019, and the entire contents of that application are incorporated by reference in this specification.

2. Description of the Related Art

In recent years, lithium secondary batteries have been advantageously used as portable power sources for personal computers, handheld devices, and the like, and as motive power sources for vehicles such as electric vehicles (EV), hybrid vehicles (HV) and plug-in hybrid vehicles (PHV).

As lithium secondary batteries have become more widespread, there have been demands for higher performance. In general, positive electrode active substances able to store and release lithium ions are used in positive electrodes of lithium secondary batteries. Use of positive electrode materials obtained by coating the surface of a positive electrode active substance particle with a titanium-containing compound is known as a technique for improving the performance of lithium secondary batteries (for example, see Japanese Patent Application Publication Nos. 2015-099646 and 2004-103566).

SUMMARY OF THE INVENTION

As a result of diligent research, the inventors of the present disclosure found that lithium secondary batteries obtained using conventional positive electrode materials exhibit increased resistance at low temperatures and are insufficient in terms of low temperature output characteristics. In addition, it was found that in cases where such lithium secondary batteries are repeatedly charged and discharged at high temperatures, there is a significant deterioration in capacity and high temperature cycle characteristics are insufficient. Furthermore, it was found that such lithium secondary batteries exhibit increased resistance when operated at high voltages and are insufficient in terms of durability against high voltage.

Therefore, it is an object of the present disclosure to provide a positive electrode material which can impart a lithium secondary battery with excellent low temperature output characteristics, excellent high temperature cycle characteristics and excellent durability against high voltage.

A positive electrode material of a lithium secondary battery disclosed here includes a positive electrode active substance particle, a Li-free first coating at a surface of the positive electrode active substance particle, and a Li-containing second coating at the surface of the positive electrode active substance particle. The first coating contains a titanium oxide represented by $TiO_2$ or $Ti_nO_{2n-1}$, wherein n is an integer of 3 or more. The second coating contains a composite oxide containing Li and Ti, wherein a ratio of a number of atoms of Li relative to a number of atoms of Ti at least 0.1 and at most 3.

Provided by such a configuration is a positive electrode material which can impart a lithium secondary battery with excellent low temperature output characteristics, excellent high temperature cycle characteristics and excellent durability against high voltage.

In a desired aspect of the positive electrode material of a lithium secondary battery disclosed here, in the composite oxide contained in the second coating, the ratio of the number of atoms of Li relative to the number of atoms of Ti is at least 0.9 and at most 2.5.

According to such a configuration, the effects of improving low temperature output characteristics, improving high temperature cycle characteristics and improving durability against high voltage are particularly enhanced.

In a desired aspect of the positive electrode material of a lithium secondary battery disclosed here, the first coating is present on the second coating.

According to such a configuration, the effects of improving low temperature output characteristics, improving high temperature cycle characteristics and improving durability against high voltage are particularly enhanced.

In a desired aspect of the positive electrode material of a lithium secondary battery disclosed here, a total amount of Ti contained in the first coating and the second coating is at least 0.01 mass % and at most 10 mass % relative to a mass of the positive electrode active substance particle.

According to such a configuration, the effects of improving low temperature output characteristics, improving high temperature cycle characteristics and improving durability against high voltage are particularly enhanced.

In a desired aspect of the positive electrode material of a lithium secondary battery disclosed here, a ratio of an area of the first coating relative to an area of the second coating on the positive electrode active substance particle is at least 0.01 and at most 3.

According to such a configuration, the effects of improving low temperature output characteristics, improving high temperature cycle characteristics and improving durability against high voltage are particularly enhanced.

A lithium secondary battery disclosed here includes a positive electrode, a negative electrode and an electrolyte, wherein the positive electrode contains the positive electrode material mentioned above.

According to such a configuration, the lithium secondary battery exhibits excellent low temperature output characteristics, excellent high temperature cycle characteristics and excellent durability against high voltage.

DESCRIPTION OF THE PREFERRED EMBODIMENTS

Hereinafter, an embodiment according to the present disclosure will be described. It should be noted that matters (for example, general configurations of the positive electrode material of a lithium secondary battery which do not characterize the present disclosure) other than the matter specifically set forth in the present specification and that may be necessary for carrying out the present disclosure may be comprehended as design matters for a person with ordinary skill in the art on the basis of prior art in the relevant field. The present disclosure can be carried out on the basis of the disclosure in the present specification and common general technical knowledge in the relevant field. In the drawings below, members and portions that elicit identical effects are denoted with identical reference numerals. The dimensional relationships (length, width, thickness and so forth) in the figures do not necessarily reflect actual dimensional relationships.

It should be noted that the term "secondary battery" in the present specification means electricity storage devices in general that can be repeatedly charged and discharged, and is a term that encompasses so-called storage batteries and electricity storage elements such as electrical double layer capacitors.

In addition, the term "lithium secondary battery" in the present specification means a secondary battery in which lithium ions are used as charge carriers and charging and discharging are effected by means of charge transfer involving lithium ions between positive and negative electrodes.

The positive electrode material of a lithium secondary battery according to the present embodiment includes a positive electrode active substance particle, a Li-free first coating at the surface of the positive electrode active substance particle, and a Li-containing second coating at the surface of the positive electrode active substance particle.

A publicly known positive electrode active substance used in a lithium secondary battery may be used as the positive electrode active substance contained in the positive electrode material according to the present embodiment. Specifically, it is possible to use, for example, a lithium composite oxide, a lithium-transition metal phosphate compound, or the like. The crystal structure of the positive electrode active substance is not particularly limited, and may be a layered structure, a spinel structure, an olivine structure, or the like.

A lithium-transition metal composite oxide containing at least one of Ni, Co and Mn as a transition metal element is desired as the lithium composite oxide, and specific examples thereof include lithium-nickel-based composite oxides, lithium-cobalt-based composite oxides, lithium-manganese-based composite oxides, lithium-nickel-manganese-based composite oxides, lithium-nickel-cobalt-manganese-based composite oxides, lithium-nickel-cobalt-aluminum-based composite oxides and lithium-iron-nickel-manganese-based composite oxides.

From the perspective of low initial resistance, the lithium composite oxide desirably has a layered structure, and a lithium-nickel-cobalt-manganese-based composite oxide having a layered structure is more desired.

It should be noted that in the present specification, "lithium-nickel-cobalt-manganese-based composite oxide" is a term that encompasses not only oxides containing Li, Ni, Co, Mn and O as constituent elements, but also oxides containing one or two or more additional elements in addition to these elements. Examples of such additional elements include transition metal elements and typical metal elements such as Mg, Ca, Al, Ti, V, Cr, Si, Y, Zr, Nb, Mo, Hf, Ta, W, Na, Fe, Zn and Sn. Furthermore, additional elements may be metalloid elements such as B, C, Si and P, and non-metallic elements such as S, F, Cl, Br and I. The same also applies to the lithium-nickel-based composite oxides, lithium-cobalt-based composite oxides, lithium-manganese-based composite oxides, lithium-nickel-manganese-based composite oxides, lithium-nickel-cobalt-aluminum-based composite oxides and lithium-iron-nickel-manganese-based composite oxides mentioned above.

An oxide having a composition represented by formula (I) below is desired as the lithium-nickel-cobalt-manganese-based composite oxide.

$$Li_{1+x}Ni_yCo_zMn_{(1-y-z)}M_\alpha O_{2-\beta}Q_\beta \qquad \text{Formula (I)}$$

In Formula (I), the values of x, y, z, $\alpha$ and $\beta$ satisfy the inequalities $0 \leq x \leq 0.7$, $0.1 < y < 0.9$, $0.1 < z < 0.4$, $0 \leq \alpha \leq 0.1$, and $0 \leq \beta \leq 0.5$. M is at least one element selected from the group consisting of Zr, Mo, W, Mg, Ca, Na, Fe, Cr, Zn, Si, Sn and Al. Q is at least one element selected from the group consisting of F, Cl and Br. From the perspectives of energy density and thermal stability, it is desirable for y and z to satisfy the inequalities $0.3 \leq y \leq 0.5$ and $0.20 \leq z < 0.4$.

Examples of lithium-transition metal phosphate compounds include lithium iron phosphate ($LiFePO_4$), lithium manganese phosphate ($LiMnPO_4$) and lithium iron manganese phosphate.

The shape of the positive electrode active substance particle is not particularly limited, and can be spherical, plate-like, needle-shaped, irregular-shaped, or the like. In addition, positive electrode active substance particles may be in the form of secondary particles caused by aggregation of primary particles, and may also be in the form of hollow particles.

The average particle diameter ($D_{50}$) of positive electrode active substance particles is not particularly limited, but is, for example, at least 0.05 μm and at most 20 μm, desirably at least 0.5 μm and at most 15 μm, and more desirably at least 3 μm and at most 15 μm.

It should be noted that the average particle diameter ($D_{50}$) of positive electrode active substance particles can be determined by means of, for example, a laser diffraction scattering method or the like.

The first coating does not contain Li, and contains a titanium oxide represented by $TiO_2$ or $Ti_nO_{2n-1}$, wherein n is an integer of 3 or more.

The value of n in $Ti_nO_{2n-1}$ is not particularly limited as long as this is an integer of 3 or more, but the value of n is desirably an integer of at least 3 and at most 9, and more desirably an integer of at least 3 and at most 5. That is to say, $Ti_nO_{2n-1}$ is more desirably $Ti_3O_5$, $Ti_4O_7$ or $Ti_5O_9$.

The second coating contains Li, and contains a composite oxide containing Li and Ti, wherein the ratio of the number of atoms of Li relative to the number of atoms of Ti (Li/Ti) is at least 0.1 and at most 3. That is to say, the second coating contains a lithium-titanium composite oxide (or lithium titanate). From the perspective of further enhancing the effects of improving low temperature output characteristics, improving high temperature cycle characteristics and improving durability against high voltage, the ratio of the number of atoms of Li relative to the number of atoms of Ti (Li/Ti) is desirably at least 0.9 and at most 2.5.

It should be noted that methods for synthesizing lithium-titanium composite oxides (or lithium titanates) having a variety of Li and Ti atom number ratios are publicly known. In addition, the ratio of the number of atoms of Li relative to the number of atoms of Ti can be adjusted by subjecting at least two types of compound selected from the group consisting of a titanium oxide, a lithium oxide and a lithium-titanium composite oxide to a mechanochemical treatment for compounding, at a prescribed mixing ratio.

The thickness of the first coating and the thickness of the second coating are not particularly limited and are, for example, at least 0.1 nm and at most 100 nm. The thickness of the first coating and the thickness of the second coating can be determined by, for example, observing a cross section of the positive electrode material with an electron microscope.

In the positive electrode material according to the present embodiment, it is desirable for the first coating to be present on the second coating. In such a case, the effects of improving low temperature output characteristics, improving high temperature cycle characteristics and improving durability against high voltage are further enhanced. It can be confirmed that the first coating is present on the second coating by observing a cross section of a positive electrode active substance particle using and electron microscope. It should be noted that it is not necessarily essential for all of the first coating and second coating on a positive electrode active substance particle to be in a state where the first coating is present on the second coating, and if at least a part of the first coating and second coating on a positive electrode active substance particle are in a state where the first coating is present on the second coating, the further enhanced effects mentioned above can be obtained.

In the positive electrode material according to the present embodiment, the total amount of Ti contained in the first coating and the second coating is desirably at least 0.01 mass % and at most 10 mass % relative to the mass of the positive electrode active substance particle. If the total amount of Ti falls within this range, the effects of improving low temperature output characteristics, improving high temperature cycle characteristics and improving durability against high voltage are further enhanced. It should be noted that the amount of Ti in the coatings can be determined by ICP analysis or the like.

In the positive electrode material according to the present embodiment, the ratio of the area of the first coating relative to the area of the second coating on the positive electrode active substance particle (area of first coating/area of second coating) is desirably at least 0.01 and at most 3. If this area ratio falls within this range, the effects of improving low temperature output characteristics, improving high temperature cycle characteristics and improving durability against high voltage are further enhanced.

It should be noted that this area ratio can be determined using, for example, the method described below.

A positive electrode active substance is photographed using an electron microscope, the total length of the circumference of the positive electrode active substance particle covered by the first coating and the total length of the circumference of the positive electrode active substance particle covered by the second coating are determined, and the ratio of these lengths (total length of circumference covered by first coating/total length of circumference covered by second coating) is calculated. In addition, this ratio is determined for 10 or more particles, and the average value thereof is calculated. The average value for this ratio can be regarded as the ratio represented by area of first coating/area of second coating.

Figure 1:
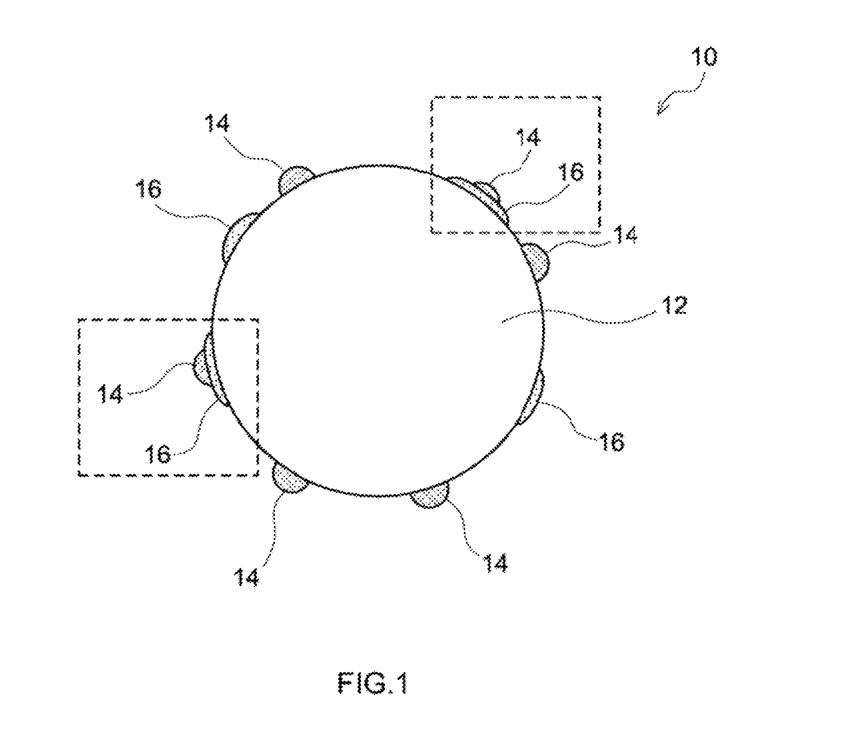
FIG. 1 is a schematic cross-sectional view showing an example of a positive electrode material according to one embodiment of the present disclosure.

FIG. 1 shows an example of a positive electrode material according to the present embodiment. FIG. 1 is a schematic cross-sectional view of a positive electrode material 10 according to this example. As shown in the drawing, a first coating 14 and a second coating 16 are scattered on the surface of a positive electrode active substance particle 12. Therefore, the first coating 14 and the second coating 16 partially cover the surface of the positive electrode active substance particle 12. Locations where the first coating 14 is present on the second coating 16 are shown inside the rectangular boxes in FIG. 1.

In the example shown, the first coating 14 and the second coating 16 are present in the form of islands (that is to say, scattered) at the surface of the positive electrode active substance particle 12, but the manner in which the first coating 14 and the second coating 16 cover the surface of the positive electrode active substance particle 12 is not particularly limited. It is possible for at least one of the first coating 14 and the second coating 16 to form a single layer and completely cover the surface of the positive electrode active substance particle 12. However, from the perspective of battery characteristics, it is desirable for the first coating 14 and the second coating 16 to be scattered at the surface of the positive electrode active substance particle 12 and partially cover the positive electrode active substance particle 12.

By causing the first coating of a Li-free titanium oxide and the second coating of a Li-containing titanium oxide to coexist at the surface of the positive electrode active substance particle, as described above, it is possible to improve the low temperature output characteristics, high temperature cycle characteristics and durability against high voltage of a lithium secondary battery. This is inferred to be for the following reason.

When a lithium secondary battery is operated at a low temperature, the mobility of Li carriers in a non-aqueous electrolyte solution or solid electrolyte decreases, there is a delay in Li carriers reaching the surface of a positive electrode active substance, and low temperature output therefore decreases. In the present embodiment, however, the Li carrier concentration specifically increases in regions of a non-aqueous electrolyte solution or solid electrolyte close to both the first coating and second coating at the surface of a positive electrode active substance particle. A region where the Li carrier concentration is high acts as a buffer, and it is possible to suppress a shortage of Li at the surface of the active substance, and therefore possible to suppress a decrease in low temperature output. In particular, in cases where the first coating is present on the second coating, regions where the Li carrier concentration is high are enlarged and the effect of improving low temperature output is further enhanced.

In addition, in these regions where the Li carrier concentration is high, negatively charged oxygen ions and dissolved oxygen are concentrated at the same time. As a result, the apparent oxygen partial pressure or oxygen concentration increases at the surface of the positive electrode active substance, release of oxygen from the positive electrode active substance is suppressed and high temperature cycle characteristics are improved.

In addition, in cases where a lithium secondary battery is operated at a high voltage (for example, 4.5 V or more), the crystal structure of a positive electrode active substance breaks down and the resistance of the battery increases. However, after a lithium secondary battery obtained using the positive electrode material according to the present embodiment was operated at a high voltage, when the crystallinity thereof was confirmed by means of a transmission electron microscope, it was confirmed that the crystal structure was substantially maintained. Therefore, in the positive electrode material according to the present embodiment, break down of the crystal structure of the positive electrode active substance is suppressed by the first coating and the second coating, and an increase in battery resistance is suppressed. Furthermore, elution of Ti at the surface of the positive electrode active substance is suppressed. As a result, durability against high voltage is improved.

The positive electrode material according to the present embodiment can be produced by, for example, causing constituent materials of the first coating and constituent materials of the second coating to adhere to the surface of a positive electrode active substance particle by means of a mechanochemical treatment, a barrel sputtering treatment, or the like.

In addition, in order to cause the first coating to be present on the second coating, it is convenient to form the second coating over a wide area of the surface of a positive electrode active substance particle by means of a barrel sputtering treatment or a mechanochemical treatment and then form the first coating by means of a mechanochemical treatment.

It should be noted that, in a barrel sputtering treatment, in cases where the surface of a positive electrode active substance particle is treated using a suitable cationic treatment agent (for example, a diethyl sulfate salt of a vinylpyrrolidone-N,N-dimethylaminoethylmethacrylic acid copolymer or the like) and a positive charge is imparted to the surface of the positive electrode active substance particle, it is possible to form a coating selectively on a region imparted with the positive charge. That is to say, in the case mentioned above, it is possible to control regions to be coated and it is possible to easily form the second coating over a wide area.

The positive electrode material according to the present embodiment is for a lithium secondary battery, and it is possible to construct a lithium secondary battery in accordance with a publicly known method using the positive electrode material according to the present embodiment. Here, with reference to the drawings, an explanation will now be given of a specific example of a configuration of a lithium secondary battery provided with a positive electrode that contains the positive electrode material according to the present embodiment. It should be noted that such a lithium secondary battery is not limited to the example explained below.

Figure 2:
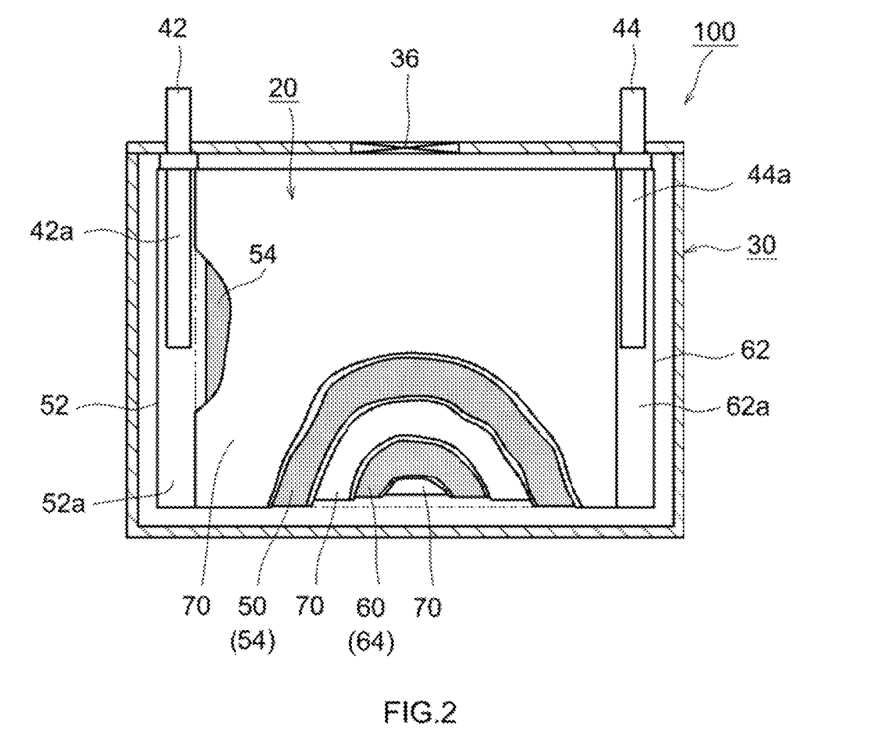
FIG. 2 is a cross-sectional view that schematically illustrates a configuration of a lithium secondary battery constructed using a positive electrode material according to one embodiment of the present disclosure.

A lithium secondary battery 100 shown in FIG. 2 is a sealed battery constructed by housing a flat wound electrode body 20 and a non-aqueous electrolyte solution (not shown) in a flat square battery case (that is to say, an outer container) 30. The battery case 30 is provided with a positive electrode terminal 42 and negative electrode terminal 44 for external connections, and a thin-walled safety valve 36, which is set to release the pressure inside the battery case 30 when this pressure reaches or exceeds a prescribed level. The positive and negative electrode terminals 42, 44 are electrically connected to positive and negative electrode current collector plates 42a, 44a, respectively. A metallic material which is lightweight and exhibits good thermal conductivity, such as aluminum, can be used as the constituent material of the battery case 30.

Figure 3:
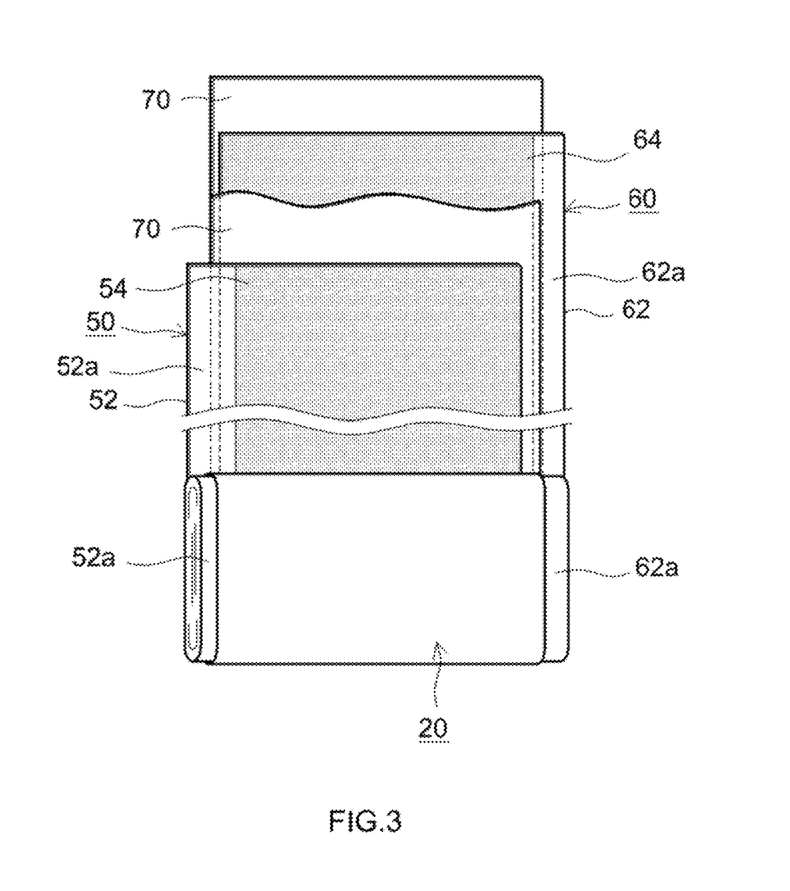
FIG. 3 is a cross-sectional view that schematically illustrates a configuration of a wound electrode body of a lithium secondary battery constructed using a positive electrode material according to one embodiment of the present disclosure.

As shown in FIG. 2 and FIG. 3, the wound electrode body 20 results from laminating a positive electrode sheet 50 in which a positive electrode active substance layer 54 is formed along the longitudinal direction, on one face or both faces (herein both faces) of an elongated positive electrode collector 52, and a negative electrode sheet 60 in which a negative electrode active substance layer 64 is formed along the longitudinal direction, on one face or both faces (herein both faces) of an elongated negative electrode collector 62, with two elongated separator sheets 70 interposed in between, and by winding then the resulting laminate in the longitudinal direction. The positive electrode collector plate 42a and the negative electrode collector plate 44a are respectively joined to a positive electrode active substance layer non-formation section 52a (i.e. exposed portion of the positive electrode collector 52 at which the positive electrode active substance layer 54 is not formed) and a negative electrode active substance layer non-formation section 62a (i.e. exposed portion of the negative electrode collector 62 at which the negative electrode active substance layer 64 is not formed) that are formed so as to protrude outward from both edges of the wound electrode body 20 in the winding axis direction thereof (sheet width direction perpendicular to the longitudinal direction).

For example, an aluminum foil or the like can be used as the positive electrode current collector 52 that constitutes the positive electrode sheet 50. The positive electrode active substance layer 54 contains the positive electrode material according to the present embodiment described above, which is a material containing a positive electrode active substance. In addition, the positive electrode active substance layer 54 may further contain an electrically conductive material, a binder, and the like. Carbon black such as acetylene black (AB) or other carbon materials (graphite or the like) can be advantageously used as the electrically conductive material. For example, poly(vinylidene fluoride) (PVDF) or the like can be used as the binder.

For example, a copper foil or the like can be used as the negative electrode current collector 62 that constitutes the negative electrode sheet 60. The negative electrode active substance layer 64 contains a negative electrode active substance. For example, a carbon material such as graphite, hard carbon or soft carbon can be used as the negative electrode active substance. The negative electrode active substance layer 64 may further contain a binder, a thickening agent, and the like. For example, a styrene-butadiene rubber (SBR) or the like can be used as the binder. For example, carboxymethyl cellulose (CMC) or the like can be used as the thickening agent.

A variety of porous sheets similar to those used in conventional lithium secondary batteries can be used as the separator 70, and examples thereof include porous resin sheets including resins such as polyethylene (PE) and polypropylene (PP). This type of porous resin sheet may have a single layer structure or a multilayer structure having two or more layers (for example, a three layer structure obtained by laminating a PP layer on both surfaces of a PE layer). A heat-resistant layer (HRL) may be provided on the separator 70.

The non-aqueous electrolyte solution can be one similar to those used in conventional lithium secondary batteries, and an electrolyte solution obtained by incorporating a supporting electrolyte in an organic solvent (a non-aqueous solvent) can typically be used. Aprotic solvents such as carbonates, esters and ethers can be used as the non-aqueous solvent. Of these, carbonates such as ethylene carbonate (EC), diethyl carbonate (DEC), dimethyl carbonate (DMC) and ethyl methyl carbonate (EMC) can be advantageously used. In addition, fluorine-based solvents, such as fluorinated carbonates such as monofluoroethylene carbonate (MFEC), difluoroethylene carbonate (DFEC), monofluoromethyldifluoromethyl carbonate (F-DMC) and trifluorodimethyl carbonate (TFDMC) can be advantageously used. It is possible to use one such non-aqueous solvent in isolation or an appropriate combination of two or more types thereof.

Lithium salts such as $LiPF_6$, $LiBF_4$ and lithium bis(fluorosulfonyl)imide (LiFSI) can be advantageously used as the supporting electrolyte. The concentration of the supporting electrolyte is desirably at least 0.7 mol/L and at most 1.3 mol/L.

It should be noted that the non-aqueous electrolyte solution may contain components other than the non-aqueous solvent and supporting electrolyte mentioned above, for example, additives such as gas-generating agents, film-forming agents, dispersing agents and thickening agents, as long as the advantageous effect of the present disclosure is not significantly impaired.

The lithium secondary battery 100 can be used in a variety of applications. Examples of desired applications include motive power sources mounted to vehicles such as plug-in hybrid vehicles (PHV), hybrid vehicles (HV) and electric vehicles (EV). The lithium secondary battery 100 can be used in the form of a battery pack in which a plurality of lithium secondary batteries are electrically connected to each other.

An explanation has been given above of an angular lithium secondary battery provided with a flat wound electrode body. However, the positive electrode material according to the present embodiment can be used in a variety of other types of lithium secondary battery in accordance with publicly known methods. For example, it is possible to construct a lithium secondary battery provided with a stacked-type electrode body using the positive electrode material according to the present embodiment. In addition, it is possible to construct a cylindrical lithium secondary battery, a laminate-type lithium secondary battery, and the like, using the positive electrode material according to the present embodiment.

In addition, it is possible to construct an all solid state lithium secondary battery using the positive electrode material according to the present embodiment in accordance with a publicly known method using a solid electrolyte instead of a non-aqueous electrolyte solution.

Explanations will now be given of examples relating to the present disclosure, but the present disclosure is not intended to be limited to these examples.

Example 1

Production of Positive Electrode Material

First, $LiNi_{1/3}Co_{1/3}Mn_{1/3}O_2$ particles having a layered structure were produced as positive electrode active substances in accordance with a conventional method.

Specifically, sulfates of Ni, Co and Mn were dissolved in water at a Ni:Co:Mn molar ratio of 1:1:1. By neutralizing this solution through addition of NaOH, a composite hydroxide containing Ni, Co and Mn was precipitated as a precursor of a positive electrode active substance. The obtained composite hydroxide and lithium carbonate were mixed at a molar ratio of 1:1. $LiNi_{1/3}Co_{1/3}Mn_{1/3}O_2$ particles having a layered structure were obtained by firing this mixture for 15 hours at a temperature of 800° C. The average particle diameter ($D_{50}$) of these $LiNi_{1/3}Co_{1/3}Mn_{1/3}O_2$ particles was measured by means of a laser diffraction scattering method, and found to be 10 μm.

Next, the $LiNi_{1/3}Co_{1/3}Mn_{1/3}O_2$ particles having a layered structure were placed in a mechanochemical apparatus together with a $TiO_2$ powder for a first coating, and subjected to a mechanochemical treatment at 6,000 rpm for 30 minutes (treatment 1). The usage quantity of the $TiO_2$ powder was such that the amount of Ti was 0.1 mass % relative to the mass of the $LiNi_{1/3}Co_{1/3}Mn_{1/3}O_2$ particles.

Next, $LiTiO_2$ for a second coating (a lithium-titanium composite oxide; Li/Ti atom number ratio=1) was also placed in the mechanochemical apparatus and subjected to a mechanochemical treatment at 6,000 rpm for 30 minutes (treatment 2). The usage quantity of the $LiTiO_2$ powder was such that the amount of Ti was 0.1 mass % relative to the mass of the $LiNi_{1/3}Co_{1/3}Mn_{1/3}O_2$ particles.

A positive electrode material in which the first coating and the second coating were provided at the surface of the positive electrode active substance was obtained in this way.

Production of Evaluation Lithium Secondary Battery

A slurry for forming a positive electrode active substance layer, having a solid content concentration of 56 mass % was prepared by mixing the thus produced positive electrode material, acetylene black (AB) as an electrically conductive material and poly(vinylidene fluoride) (PVDF) as a binder at a positive electrode material:AB:PVDF mass ratio of 80:8:2, and mixing in N-methylpyrrolidone (NMP) using a planetary mixer. A positive electrode sheet was produced by coating this slurry on both surfaces of an aluminum foil using a die coater, drying and pressing the resultant.

In addition, a slurry for forming a negative electrode active substance layer was prepared by mixing natural graphite (C) as a negative electrode active substance, a styrene-butadiene rubber (SBR) as a binder and carboxymethyl cellulose (CMC) as a thickening agent in ion exchanged water at a C:SBR:CMC mass ratio of 98:1:1. A negative electrode sheet was produced by coating this slurry on both surfaces of a copper foil, drying and pressing the resultant.

In addition, two separator sheets (porous polyolefin sheets) were prepared.

The prepared positive electrode sheet and negative electrode sheet and the two prepared separator sheets were overlaid and wound, thereby preparing a wound electrode body. Electrode terminals were attached to the positive electrode sheet and negative electrode sheet of the produced wound electrode body by welding, and the welded body was housed in a battery case having an injection port.

Next, a non-aqueous electrolyte solution was poured into the battery case from the injection port, and the injection port was then tightly sealed. It should be noted that a non-aqueous electrolyte solution obtained by dissolving $LiPF_6$ as a supporting electrolyte at a concentration of 1.0 mol/L in a mixed solvent containing ethylene carbonate (EC), ethyl methyl carbonate (EMC) and dimethyl carbonate (DMC) at a volume ratio of 1:1:1 was used as the non-aqueous electrolyte solution.

An evaluation lithium secondary battery of Example 1 was obtained in this way.

Comparative Example 1

An evaluation lithium secondary battery was produced in the same way as in Example 1, except that the $LiNi_{1/3}Co_{1/3}Mn_{1/3}O_2$ particles having a layered structure produced in Example 1 were used without modification as the positive electrode material.

Comparative Examples 2 to 5

Positive electrode materials having only a first coating were obtained in the same way as in Example 1, except that treatment 2 was not carried out and $LiNi_{1/3}Co_{1/3}Mn_{1/3}O_2$ particles were subjected to a mechanochemical treatment together with the titanium oxides shown in Table 1 as treatment 1. Next, evaluation lithium secondary batteries were produced in the same way as in Example 1, except that these positive electrode materials were used.

Comparative Examples 6 to 13

Positive electrode materials having only a second coating were obtained in the same way as in Example 1, except that treatment 1 was not carried out and $LiNi_{1/3}Co_{1/3}Mn_{1/3}O_2$ particles were subjected to a mechanochemical treatment together with only the lithium-titanium composite oxides shown in Table 1 as treatment 2. Next, evaluation lithium secondary batteries were produced in the same way as in Example 1, except that these positive electrode materials were used.

Examples 2 to 11

Positive electrode materials were produced in the same way as in Example 1, except that the titanium oxides shown in Table 1 and the lithium-titanium composite oxides shown in Table 1 were used. Next, evaluation lithium secondary batteries were produced in the same way as in Example 1, except that these positive electrode materials were used.

Example 12

$LiNi_{1/3}Co_{1/3}Mn_{1/3}O_2$ particles having a layered structure were produced in the same way as in Example 1.

These particles were treated with a solution of a diethyl sulfate salt of a vinylpyrrolidone-N,N-dimethylaminoethyl-methacrylic acid copolymer. Next, $LiTiO_2$ was sputtered on the surface of the $LiNi_{1/3}Co_{1/3}Mn_{1/3}O_2$ particles using a barrel sputtering apparatus so as to provide a second coating. The sputtering amount was such that the amount of Ti was 0.1 mass % relative to the mass of the $LiNi_{1/3}Co_{1/3}Mn_{1/3}O_2$ particles.

The particles were washed with a mixed solvent of ethanol and water, then placed in a mechanochemical apparatus together with a $TiO_2$ powder for a first coating, and subjected to a mechanochemical treatment at 6,000 rpm for 30 minutes. The usage quantity of the $TiO_2$ powder was such that the amount of Ti was 0.1 mass % relative to the mass of the $LiNi_{1/3}Co_{1/3}Mn_{1/3}O_2$ particles.

An evaluation lithium secondary battery was produced in the same way as in Example 1, except that the thus obtained positive electrode material was used.

Examples 13 to 30

Positive electrode materials were produced in the same way as in Example 12, except that the $LiTiO_2$ sputtering amount and the $TiO_2$ powder usage quantity were altered. Next, evaluation lithium secondary batteries were produced in the same way as in Example 1, except that these positive electrode materials were used.

Observation of Coated State

Cross sections of the positive electrode materials produced in the examples were observed using a STEM. The results confirmed that a titanium oxide coating (a first coating) and a lithium-titanium composite oxide coating (a second coating) were scattered at the surface of the $LiNi_{1/3}Co_{1/3}Mn_{1/3}O_2$ particles. In addition, a mode in which the first coating was present on the second coating was not seen in Examples 1 to 11. However, a mode in which the first coating was present on the second coating was observed in Examples 12 to 30.

In addition, in the cross section STEM photographs, the total length of the circumference of the $LiNi_{1/3}Co_{1/3}Mn_{1/3}O_2$ particle covered by the first coating and the total length of the circumference of the $LiNi_{1/3}Co_{1/3}Mn_{1/3}O_2$ particle covered by the second coating in one $LiNi_{1/3}Co_{1/3}Mn_{1/3}O_2$ particle were determined. The ratio of these determined circumference lengths (total length of circumference covered by first coating/total length of circumference covered by second coating) was calculated. This ratio was determined for 10 particles, and the average value thereof was calculated. This average value was taken to be the ratio represented by area of first coating/area of second coating.

Activation and Measurement of Initial Capacity

Each produced evaluation lithium secondary battery was placed in an environment at a temperature of 25° C. Activation (initial charging) was carried out using a constant current-constant voltage method, which included subjecting each evaluation lithium secondary battery to constant current charging at a current of ⅓ C to a voltage of 4.2 V, and then constant voltage charging until the current reached 1/50 C, thereby achieving a fully charged state. Next, each evaluation lithium secondary battery was subjected to constant current discharging at a current of ⅓ C to a voltage of 3.0 V. At this point, the discharge capacity was measured and thus the initial capacity was determined.

Measurement of Low Temperature Resistance

Each activated evaluation lithium secondary battery was adjusted to a voltage of 3.70 V (open circuit voltage) and then left in an environment at −15° C. Each evaluation lithium secondary battery was discharged for 8 seconds at a current of 20 C. The voltage decrease amount ΔV at this point was determined, and the battery resistance was calculated using the current and this ΔV value. With the resistance of an evaluation lithium secondary battery obtained using the positive electrode of Comparative Example 1 taken to be 1, the ratios of the resistance of evaluation lithium secondary batteries obtained using the positive electrodes of other comparative examples and examples were determined. The results are shown in Tables 1 and 2.

Evaluation of High Temperature Cycle Characteristics

Each activated evaluation lithium secondary battery was left in an environment at 60° C., and a cycle including constant current charging at a current of 10 C to a voltage of 4.2 V and then constant current discharging at a current of 10 C to a voltage of 3.3 V was repeated 200 times. The discharge capacity after the 200th cycle was determined using the same method as that used for initial capacity. As an indicator of high temperature cycle characteristics, capacity retention rate (%) was determined from (discharge capacity after 200th charging/initial capacity)×100. The results are shown in Tables 1 and 2.

Evaluation of High Voltage Operation

Each activated evaluation lithium secondary battery was left in an environment at 25° C., and a cycle including constant current charging at a current of ⅓ C to a voltage of 4.5 V and then constant current discharging at a current of ⅓ C to a voltage of 3 V was repeated 10 times. The battery resistance after the 10th cycle was measured using the same method as that described above. With the resistance of an evaluation lithium secondary battery obtained using the positive electrode of Comparative Example 1 taken to be 1, the ratios of the resistance of evaluation lithium secondary batteries obtained using the positive electrodes of other comparative examples and examples were determined. The results are shown in Tables 1 and 2.

TABLE 1

| | First coating | Second coating | First coating on second coating | Total amount of Ti relative to positive electrode active substance (mass %) | First coating/second coating (area ratio) | Low temperature resistance ratio | Capacity retention rate (%) | Resistance ratio after high voltage operation |
|---|---|---|---|---|---|---|---|---|
| Comparative Example 1 | None | None | Absent | 0 | — | 1 | 50 | 1 |
| Comparative Example 2 | $TiO_2$ | None | Absent | 0.1 | — | 0.95 | 55 | 1.05 |
| Comparative Example 3 | $Ti_3O_5$ | None | Absent | 0.1 | — | 0.96 | 54 | 1.06 |
| Comparative Example 4 | $Ti_4O_7$ | None | Absent | 0.1 | — | 0.94 | 56 | 1.03 |
| Comparative Example 5 | $Ti_5O_9$ | None | Absent | 0.1 | — | 0.95 | 53 | 1.05 |
| Comparative Example 6 | None | LTO (Li/Ti = 0.1) | Absent | 0.1 | — | 0.97 | 54 | 1.07 |
| Comparative Example 7 | None | LTO (Li/Ti = 0.8) | Absent | 0.1 | — | 0.96 | 56 | 1.06 |
| Comparative Example 8 | None | LTO (Li/Ti = 0.9) | Absent | 0.1 | — | 0.94 | 54 | 1.03 |
| Comparative Example 9 | None | LTO (Li/Ti = 1) | Absent | 0.1 | — | 0.96 | 54 | 1.06 |
| Comparative Example 10 | None | LTO (Li/Ti = 2) | Absent | 0.1 | — | 0.94 | 56 | 1.03 |
| Comparative Example 11 | None | LTO (Li/Ti = 2.5) | Absent | 0.1 | — | 0.94 | 53 | 1.03 |
| Comparative Example 12 | None | LTO (Li/Ti = 2.6) | Absent | 0.1 | — | 0.95 | 53 | 1.05 |
| Comparative Example 13 | None | LTO (Li/Ti = 3) | Absent | 0.1 | — | 0.97 | 52 | 1.07 |
| Example 1 | $TiO_2$ | LTO (Li/Ti = 1) | Absent | 0.2 | 2 | 0.71 | 71 | 0.75 |
| Example 2 | $Ti_3O_5$ | LTO (Li/Ti = 1) | Absent | 0.2 | 2 | 0.7 | 72 | 0.74 |
| Example 3 | $Ti_4O_7$ | LTO (Li/Ti = 1) | Absent | 0.2 | 2 | 0.72 | 71 | 0.76 |
| Example 4 | $Ti_5O_9$ | LTO (Li/Ti = 1) | Absent | 0.2 | 2 | 0.71 | 74 | 0.75 |
| Example 5 | $TiO_2$ | LTO (Li/Ti = 0.1) | Absent | 0.2 | 2 | 0.81 | 64 | 0.85 |
| Example 6 | $TiO_2$ | LTO (Li/Ti = 0.8) | Absent | 0.2 | 2 | 0.79 | 65 | 0.83 |
| Example 7 | $TiO_2$ | LTO (Li/Ti = 0.9) | Absent | 0.2 | 2 | 0.71 | 72 | 0.75 |
| Example 8 | $TiO_2$ | LTO (Li/Ti = 2) | Absent | 0.2 | 2 | 0.72 | 71 | 0.76 |
| Example 9 | $TiO_2$ | LTO (Li/Ti = 2.5) | Absent | 0.2 | 2 | 0.71 | 72 | 0.75 |
| Example 10 | $TiO_2$ | LTO (Li/Ti = 2.6) | Absent | 0.2 | 2 | 0.82 | 66 | 0.86 |
| Example 11 | $TiO_2$ | LTO (Li/Ti = 3) | Absent | 0.2 | 2 | 0.81 | 65 | 0.85 |
| Example 12 | $TiO_2$ | LTO (Li/Ti = 1) | Present | 0.2 | 2 | 0.65 | 91 | 0.68 |

\* "LTO" denotes a lithium-titanium composite oxide, and the Li/Ti ratio is the atom number ratio.

TABLE 2

| | First coating | Second coating | First coating on second coating | Total amount of Ti relative to positive electrode active substance (mass %) | First coating/ second coating (area ratio) | Low temperature resistance ratio | Capacity retention rate (%) | Resistance ratio after high voltage operation |
|---|---|---|---|---|---|---|---|---|
| Example 13 | TiO$_2$ | LTO (Li/Ti = 1) | Present | 0.005 | 2 | 0.71 | 72 | 0.75 |
| Example 14 | TiO$_2$ | LTO (Li/Ti = 1) | Present | 0.01 | 2 | 0.64 | 90 | 0.67 |
| Example 15 | TiO$_2$ | LTO (Li/Ti = 1) | Present | 0.1 | 2 | 0.66 | 91 | 0.68 |
| Example 16 | TiO$_2$ | LTO (Li/Ti = 1) | Present | 1 | 2 | 0.63 | 89 | 0.66 |
| Example 17 | TiO$_2$ | LTO (Li/Ti = 1) | Present | 3 | 2 | 0.65 | 87 | 0.68 |
| Example 18 | TiO$_2$ | LTO (Li/Ti = 1) | Present | 5 | 2 | 0.65 | 88 | 0.68 |
| Example 19 | TiO$_2$ | LTO (Li/Ti = 1) | Present | 10 | 2 | 0.64 | 89 | 0.67 |
| Example 20 | TiO$_2$ | LTO (Li/Ti = 1) | Present | 10.5 | 2 | 0.72 | 71 | 0.76 |
| Example 21 | TiO$_2$ | LTO (Li/Ti = 1) | Present | 12 | 2 | 0.70 | 71 | 0.74 |
| Example 22 | TiO$_2$ | LTO (Li/Ti = 1) | Present | 1 | 0.005 | 0.69 | 73 | 0.74 |
| Example 23 | TiO$_2$ | LTO (Li/Ti = 1) | Present | 3 | 0.01 | 0.64 | 91 | 0.67 |
| Example 24 | TiO$_2$ | LTO (Li/Ti = 1) | Present | 3 | 0.1 | 0.63 | 90 | 0.66 |
| Example 25 | TiO$_2$ | LTO (Li/Ti = 1) | Present | 3 | 1 | 0.65 | 89 | 0.68 |
| Example 26 | TiO$_2$ | LTO (Li/Ti = 1) | Present | 3 | 1.5 | 0.65 | 91 | 0.68 |
| Example 27 | TiO$_2$ | LTO (Li/Ti = 1) | Present | 3 | 2 | 0.63 | 90 | 0.66 |
| Example 28 | TiO$_2$ | LTO (Li/Ti = 1) | Present | 3 | 3 | 0.64 | 88 | 0.67 |
| Example 29 | TiO$_2$ | LTO (Li/Ti = 1) | Present | 3 | 3.5 | 0.70 | 71 | 0.74 |
| Example 30 | TiO$_2$ | LTO (Li/Ti = 1) | Present | 3 | 4 | 0.71 | 72 | 0.75 |

* "LTO" denotes a lithium-titanium composite oxide, and the Li/Ti ratio is the atom number ratio.

From the results in Tables 1 and 2, it is understood that by using a positive electrode material in which a first coating of a Li-free specific titanium oxide and a second coating of a Li-containing specific titanium oxide coexist at the surface of a positive electrode active substance particle, it is possible to obtain a lithium ion secondary battery which exhibits excellent low temperature output characteristics, excellent high temperature cycle characteristics, and an excellent durability against high voltage.

In addition, from the results of Example 1 and Examples 5 to 11, it is understood that in cases where the ratio of the number of atoms of Li relative to the number of atoms of Ti is at least 0.9 and at most 2.5 in the lithium-titanium composite oxide of the second coating, the effects of improving low temperature output characteristics, improving high temperature cycle characteristics and improving durability against high voltage are particularly enhanced.

In addition, from the results of Example 1 and Example 12, it is understood that in cases where the first coating is present on the second coating, the effects of improving low temperature output characteristics, improving high temperature cycle characteristics and improving durability against high voltage are particularly enhanced.

In addition, from the results of Examples 13 to 21, it is understood that in cases where the total amount of Ti contained in the first coating and the second coating is at least 0.01 mass % and at most 10 mass % relative to the mass of the positive electrode active substance particle, the effects of improving low temperature output characteristics, improving high temperature cycle characteristics and improving durability against high voltage are particularly enhanced.

In addition, from the results of Examples 22 to 30, it is understood that in cases where the ratio of the area of the first coating relative to the area of the second coating on the positive electrode active substance particle is at least 0.01 and at most 3, the effects of improving low temperature output characteristics, improving high temperature cycle characteristics and improving durability against high voltage are particularly enhanced.

Comparative Examples 14 to 19

Evaluation lithium secondary batteries were produced in the same way as in Example 1, except that the positive electrode active substances shown in Table 3 were used without modification as positive electrode materials.

Examples 31 to 36

Positive electrode materials having a first coating and a second coating were produced in the same way as in Example 12, except that the positive electrode active substances shown in Table 3 were used. Evaluation lithium secondary batteries were produced in the same way as in Example 1, except that these positive electrode materials were used.

Evaluation of Characteristics

The coated state of the positive electrode materials used in Comparative Examples 14 to 19 and Examples 31 to 36 was observed in the same way as described above. Furthermore, the evaluation lithium ion secondary batteries of Comparative Examples 14 to 19 and Examples 31 to 36 were subjected to activation, initial capacity measurements, low temperature resistance measurements, high temperature cycle characteristics evaluation, and high voltage operation evaluations in the same way as described above.

For the low temperature resistance measurements and high voltage operation evaluations in experimental examples carried out using active substances having the same composition, the resistance of an example was determined as a ratio relative to a value of 1 for the resistance value of a comparative example. The evaluation results are shown in Table 3.

From the results above, it is understood that by using the positive electrode material of a lithium secondary battery according to the present embodiment, it is possible to impart a lithium secondary battery with excellent low temperature output characteristics, excellent high temperature cycle characteristics and excellent durability against high voltage.

Specific examples of the present disclosure have been explained in detail above, but these are merely examples, and do not limit the scope of the claims. The features disclosed in the claims also encompass modes obtained by variously modifying or altering the specific examples shown above.

What is claimed is:

1. A positive electrode material of a lithium secondary battery, the positive electrode material comprising:
    a positive electrode active substance particle;
    a Li-free first coating at a surface of the positive electrode active substance particle; and
    a Li-containing second coating at the surface of the positive electrode active substance particle, wherein
    the first coating contains a titanium oxide represented by $TiO_2$ or $Ti_nO_{2n-1}$, wherein n is an integer of 3 or more,
    the second coating contains a composite oxide containing Li and Ti, wherein a ratio of a number of atoms of Li relative to a number of atoms of Ti is at least 0.1 and at most 3, and

TABLE 3

| | Positive electrode active substance composition | First coating | Second coating | First coating on second coating | Total amount of Ti relative to positive electrode active substance (mass %) | First coating/ second coating (area ratio) | Low temperature resistance ratio | Capacity retention rate (%) | Resistance ratio after high voltage operation |
|---|---|---|---|---|---|---|---|---|---|
| Comparative Example 14 | $LiCoO_2$ | None | None | Absent | 0 | — | 1 | 41 | 1 |
| Example 31 | $LiCoO_2$ | $TiO_2$ | LTO (Li/Ti = 1) | Present | 3 | 1 | 0.64 | 91 | 0.68 |
| Comparative Example15 | $LiMn_2O_4$ | None | None | Absent | 0 | — | 1 | 42 | 1 |
| Example 32 | $LiMn_2O_4$ | $TiO_2$ | LTO (Li/Ti = 1) | Present | 3 | 1 | 0.63 | 92 | 0.65 |
| Comparative Example 16 | $LiNiO_2$ | None | None | Absent | 0 | — | 1 | 45 | 1 |
| Example 33 | $LiNiO_2$ | $TiO_2$ | LTO (Li/Ti = 1) | Present | 3 | 1 | 0.66 | 90 | 0.66 |
| Comparative Example 17 | $LiNi_{0.5}Mn_{1.5}O_4$ | None | None | Absent | 0 | — | 1 | 43 | 1 |
| Example 34 | $LiNi_{0.5}Mn_{1.5}O_4$ | $TiO_2$ | LTO (Li/Ti = 1) | Present | 3 | 1 | 0.64 | 89 | 0.64 |
| Comparative Example 18 | $LiNi_{0.8}Co_{0.15}Al_{0.05}O_2$ | None | None | Absent | 0 | — | 1 | 45 | 1 |
| Example 35 | $LiNi_{0.8}Co_{0.15}Al_{0.05}O_2$ | $TiO_2$ | LTO (Li/Ti = 1) | Present | 3 | 1 | 0.63 | 88 | 0.65 |
| Comparative Example 19 | $LiFePO_4$ | None | None | Absent | 0 | — | 1 | 42 | 1 |
| Example 36 | $LiFePO_4$ | $TiO_2$ | LTO (Li/Ti = 1) | Present | 3 | 1 | 0.64 | 90 | 0.66 |

* "LTO" denotes a lithium-titanium composite oxide, and the Li/Ti ratio is the atom number ratio.

From the results in Table 3, it is understood that by comparing Comparative Examples 14 to 19 and Examples 31 to 36, the effects of improving low temperature output characteristics, improving high temperature cycle characteristics and improving durability against high voltage can be achieved regardless of the composition and crystal structure of the positive electrode active substance.

all of the second coating is in contact with the surface of the positive electrode active substance particle, and at least some of the first coating is present on the second coating such that where the first coating is present on the second coating, the first coating contacts the second coating and does not contact the surface of the positive electrode active substance particle.

2. The positive electrode material of a lithium secondary battery according to claim 1, wherein in the composite oxide contained in the second coating, the ratio of the number of atoms of Li relative to the number of atoms of Ti is at least 0.9 and at most 2.5.

3. The positive electrode material of a lithium secondary battery according to claim 1, wherein a total amount of Ti contained in the first coating and the second coating is at least 0.01 mass % and at most 10 mass % relative to a mass of the positive electrode active substance particle.

4. The positive electrode material of a lithium secondary battery according to claim 1, wherein a ratio of an area of the first coating relative to an area of the second coating on the positive electrode active substance particle is at least 0.01 and at most 3.

5. A lithium secondary battery comprising:
a positive electrode;
a negative electrode; and
an electrolyte, wherein
the positive electrode contains the positive electrode material of a lithium secondary battery according to claim 1.

6. The positive electrode material of a lithium secondary battery according to claim 1, wherein all of the first coating is present on the second coating.

* * * * *